United States Patent
Weigand

(10) Patent No.: US 6,584,542 B1
(45) Date of Patent: Jun. 24, 2003

(54) MICROWAVE PAGING ARCHITECTURE

(75) Inventor: David Weigand, Santa Clara, CA (US)

(73) Assignee: National Semiconductor, Santa Clara, CA (US)

( * ) Notice: Subject to any disclaimer, the term of this patent is extended or adjusted under 35 U.S.C. 154(b) by 194 days.

(21) Appl. No.: 09/746,902

(22) Filed: Dec. 22, 2000

(51) Int. Cl.[7] .............................................. G06F 12/00
(52) U.S. Cl. ........................ 711/104; 71/220; 71/5; 71/127; 71/157; 342/1; 342/57
(58) Field of Search .................. 711/100, 104, 711/5, 220, 127, 154, 157; 342/1, 57

(56) References Cited

U.S. PATENT DOCUMENTS

| | | | | |
|---|---|---|---|---|
| 4,449,185 A | * | 5/1984 | Oberman et al. | 712/234 |
| 4,481,570 A | * | 11/1984 | Wiker | 711/5 |
| 5,303,358 A | * | 4/1994 | Baum | 712/226 |
| 5,490,260 A | * | 2/1996 | Miller et al. | 711/100 |
| 5,960,466 A | * | 9/1999 | Belgard | 711/213 |

* cited by examiner

Primary Examiner—Do Hyun Yoo
Assistant Examiner—Brian R. Peugh
(74) Attorney, Agent, or Firm—Wildman Harrold Allen & Dixon

(57) ABSTRACT

A Time Division Multiple Access (TDMA) mobile station architecture consuming less power and random access memory (RAM) is presented herein. The mobile station includes a coprocessor which executes frame programs. The frame programs include instructions which address memory. The memory includes page addresses and byte addresses. The instructions of the frame program address the page addresses and byte addresses. A particular page address is reserved as a null page address, wherein any instruction addressing the null page address causes the memory locations of the most recently accessed memory page to be accessed.

10 Claims, 10 Drawing Sheets

MICROWAVE PAGING ARCHITECTURE

TECHNICAL FIELD OF THE INVENTION

The present invention relates to mobile telecommunications, and more specifically, to mobile station (terminal) hardware.

BACKGROUND OF THE INVENTION

In a typical mobile telecommunication system, such as a Global System for Mobile communications (GSM), a mobile station operates in either a paging (idle) mode or an active mode. During the paging mode, a mobile station monitors a paging channel (PCH), located on the downlink of the control channel, used by a base station to alert mobile stations of incoming calls. A random access channel (RACH), located on the uplink of the control channel, can be used by the mobile station to transmit a request for a mobile originated call. When a connection (such as a phone call) is established, either incoming or outgoing, mobile terminated or mobile originated respectively, the base station assigns the mobile station to a traffic channel.

Pursuant to the Global System for Mobile Communications (GSM) the bandwidth is divided among many users by a combination of frequency division multiple access (FDMA) and time division multiple access (TDMA) channels. The FDMA part involves the division by frequency of 25 MHz bandwidth into 124 carrier frequencies spaced 200 Khz apart. Each of these carrier frequencies is then divided in time, using a TDMA scheme. At least one of the carrier frequencies, known as the common control channel, is used to carry various control channels. The remaining carrier frequencies (traffic channels) are used for user data and voice communications. In a TDMA scheme, a number of different mobile stations can use the same carrier frequency, but at different times. Each carrier frequencies include a repeating frame structure, wherein the frame contains time slots 0 through m-1. Each time slot can be allocated as a receive channel or a transmit channel for a different mobile station.

Referring now to FIG. 1, there is illustrated a block diagram of a physical common control channel. The physical common control channel is made up of a repeating multi-frame 100 of 51 frames 116. The multi-frame 1800 includes a Frequency Correction Channel (FCCH), frames 116(0), 116(10), 116(20), 116(30), 116(40), followed by a Synchronization Channel (SCH), frames 116(1), 116(11), 116(21), 116(31), and 116(41), a Broadcast Control Channel (BCCH), frames 116(2 . . . 5), and an Idle Frame, frame 116(50). The remaining 36 frames include logical channel types such as paging channels (PCH), frames 116(6 . . . 9, 12 . . . 19), access grant channels (AGCH), 116(22 . . . 29, 32 . . . 39, 42 . . . 49), Common Control Channel (CCCH), Stand-alone Dedicated Control Channel (SDCCH) and Slow Associated Control Channel (SACCH).

The paging channels (PCH) are divided into paging channel groups of four frames, frames 116(6 . . . 9), frames 116(12 . . . 15), and frames 116(16 . . . 19), wherein each particular frame.group forms a particular logical paging channel. The mobile station served by the base station are divided into groups, wherein each group is associated with a particular logical paging channel. While in the paging mode, the mobile stations monitors only the particular logical paging channel associated therewith. Likewise, the base station only pages the mobile station using the associated logical paging channel.

The base station uses the paging channel monitored by the mobile station to notify the mobile station of incoming calls. When the subscriber at a mobile station wishes to place an outgoing phone call, call origination, the mobile station transmits a request to place an outgoing call using one of the random access channels (RACH). Upon reception of the RACH the base station uses one of the access grant channels 116(22 . . . 29, 32 . . . 39, 42 . . . 49) to assign a receive and transmit channel to the mobile station.

Referring now to FIG. 2A, there is illustrated a block diagram of the traffic channel (TCH), referenced generally by the numeric designation 200, pursuant to the GSM specifications. The traffic channels 200 are used to carry speech and data traffic. The traffic channels 200 use a repeating TCH multiframe 205 which includes 26 frames 116. The length of the TCH multiframe is 120 ms, and thus each frame is 4.615 ms in length. Out of the 26 frames 116, 24 are used for traffic 116a, one frame is used for the Slow Associated Control Channel (SACCH) 116b, and one frame is unused, the IDLE frame 116c. Each of the 24 frames used for traffic include eight 0.576 ms burst periods, known as slots 210. Each of the slots 210 can be allocated to a different mobile station. Depending on whether the traffic channel 200 is a downlink channel or an uplink channel, the mobile station either receives or transmits data in bursts during the allocated slot 210. Wherein the traffic channel 200 is an uplink channel, the mobile station transmits data in bursts, while if the traffic channel 200 is a downlink channel, the mobile station receives data in bursts.

Each slot 210 of frames 116a allows for transmission of 156.25 bits of data, which include two 57-bit data blocks 215, 26 midamble bits 220, 2 stealing bits 225, 2 sets of 3-bit tail bits 230, and 8.25 guard bits 235. The two 57-bit data blocks 215 are used to carry user data or voice communications while the remaining bits are for control and synchronization purposes. As noted above, each slot is 0.576 ms in duration, thereby corresponding to a bit transmission rate of 270.833 Kbps on the traffic channel 200.

Referring now to FIG. 2B, there is illustrated an active mode timing diagram for a mobile station. A mobile station engaged in a phone conversation, i.e., in the active mode, is allocated one slot 210a of a downlink traffic channel 200 for receiving data bursts, and one slot 210b of an uplink traffic channel 200 for transmitting data bursts. The downlink traffic channel and slot 210a position wherein the mobile station receives the data burst is known as the receive channel, while the uplink traffic channel 200 and slot 210b position wherein the mobile station transmits the data burst define a transmit channel. Pursuant to GSM specifications, the receive channel and transmit channel are staggered, such that the traffic channel follows three slots behind the receive channel.

Additionally, mobile stations routinely measure the received signal strength of the signal received from the base station serving the mobile station as well as surrounding base stations. The foregoing permits conducting a continuous phone conversation while the mobile station traverses the coverage area of one base station and enters the coverage area of another base station. The time period wherein the mobile station measures the receive signal strength is known as a monitor cycle 240. Monitor cycles can occur anywhere within the frame but typically occur during the TDMA frame between the transmit channel and the receive channel. To satisfy some GPRS scenarios the monitor cycle must occur between the receive and the transmit.

In recent years, the use of mobile stations has increased exponentially. Whereas ordinary wireline phones require connection of the terminal to a wireline, mobile station users can engage in telephone conversations anywhere within a vast service area of the cellular telecommunications network. In addition to voice communication services, wireline telephones are often used for access to data services and the internet. Although recent advances in broadband technology allow for cable connections, digital subscriber loops (DSL), local area network (LAN) connections, and Ethernet connections, each of the foregoing have the common drawback of requiring a wireline connection. Therefore, another major benefit mobile stations provide is wireless access to the internet and data services.

However, many mobile telecommunications systems are based on circuit switched radio transmission. At the air interface, complete transmit 210*b* and receive channels 210*a* are allocated for a single user for the entire call period. Data on the internet, and many data services, is transmitted in packets. For example, the Internet Protocol (IP) is used to packetize data transmitted on the internet. Allocation of a complete traffic channel 200 for a single user for an entire internet or data service session results in highly inefficient resource allocation. Alternatively, a packet switched bearer scheme, wherein a channel is only allocated when needed and released immediately after the transmission of the packets, results in a better utilization of the traffic channels 200.

General Packet Radio Service (GPRS) is a cellular packet data technology developed for GSM which applies a packet radio principles to transfer user data packets in an efficient way between mobile stations and packet data networks, such as the Internet. GPRS provides fast connection session establishment times, and billing based on the amount of transferred data.

In conventional GSM, a receive time slot 210*a* and transmit time slot 210*b* are allocated to a mobile station for the duration of a phone call, regardless of whether data or voice are transmitted. In contrast to GSM, receive and transmit time slots 210 are allocated separately and only when data packets are sent or received. During the periods of data packet transmission/reception, GPRS allows for allocation of multiple time slots 210 to a single mobile station. After transmission or reception, the allocated time slots 210 are released. In this manner, multiple users can share a traffic channel 200.

A GSM telecommunication system supports GPRS by allocating traffic channels 200 for GPRS packet traffic. A traffic channel 200 allocated for GPRS traffic is known as a packet data channel (PDCH). The PDCHs can be allocated dynamically depending on the current traffic load for voice and data communications in the mobile telecommunication system. Additionally, GPRS also includes a number of logical channels, such as the packet broadcast control channel (PBCCH), the packet common control channel (PCCCH), and packet dedicated control channels. The foregoing burst transmission and reception periods for voice, as well as packet data reception and transmission are achieved by selectively enabling and disabling the receiver and transmitter components of the mobile station. Mobile stations typically contain microprocessors and digital signal processing (DSP) cores. The microprocessor is responsible for controlling the receiver and transmitter components of the mobile station and running a protocol stack, while the DSP core is responsible for baseband processing the received signal and transmitted signal. The receiver and transmitter components require timing critical operation for precise synchronization with the TDMA scheme.

The timing critical operation of the receiver and transmitter are tedious tasks for the microprocessor which is more suitable for more general purpose tasks. Additionally, the microprocessor consumes considerable power from the battery in the foregoing tasks, thereby reducing the battery life of the phone. To alleviate the computational load and as well reduce the power consumption, the timing critical operations are off-loaded to time critical hardware.

The time critical hardware can include comparators, and counters, as well as internal clocks. Although the foregoing achieves some power savings, considerable die space is consumed. Furthermore, as enhancements are added to GSM, such as GPRS, additional hardware increases on an exponential basis. Therefore, addition of hardware is a non-scalable solution. While it is extremely important to reduce power consumption it is also important to have a coprocessor architecture that is as small as possible since die size is an important factor also.

Accordingly, it would be advantageous if the power consumption could be reduced.

It would also be advantageous if a scalable architecture could be developed to adapt to modifications and enhancements of mobile telecommunications systems.

SUMMARY

Disclosed herein is a system, method, and apparatus for controlling radio components. A first instruction is executed which addresses a page and byte of memory. After executing the first instruction, a second instruction is fetched which addresses a second page address and a second byte address. Responsive thereto, a memory location at the first page address and the second byte address is accessed.

DETAILED DESCRIPTION OF PREFERRED EMBODIMENTS

Figure 3:
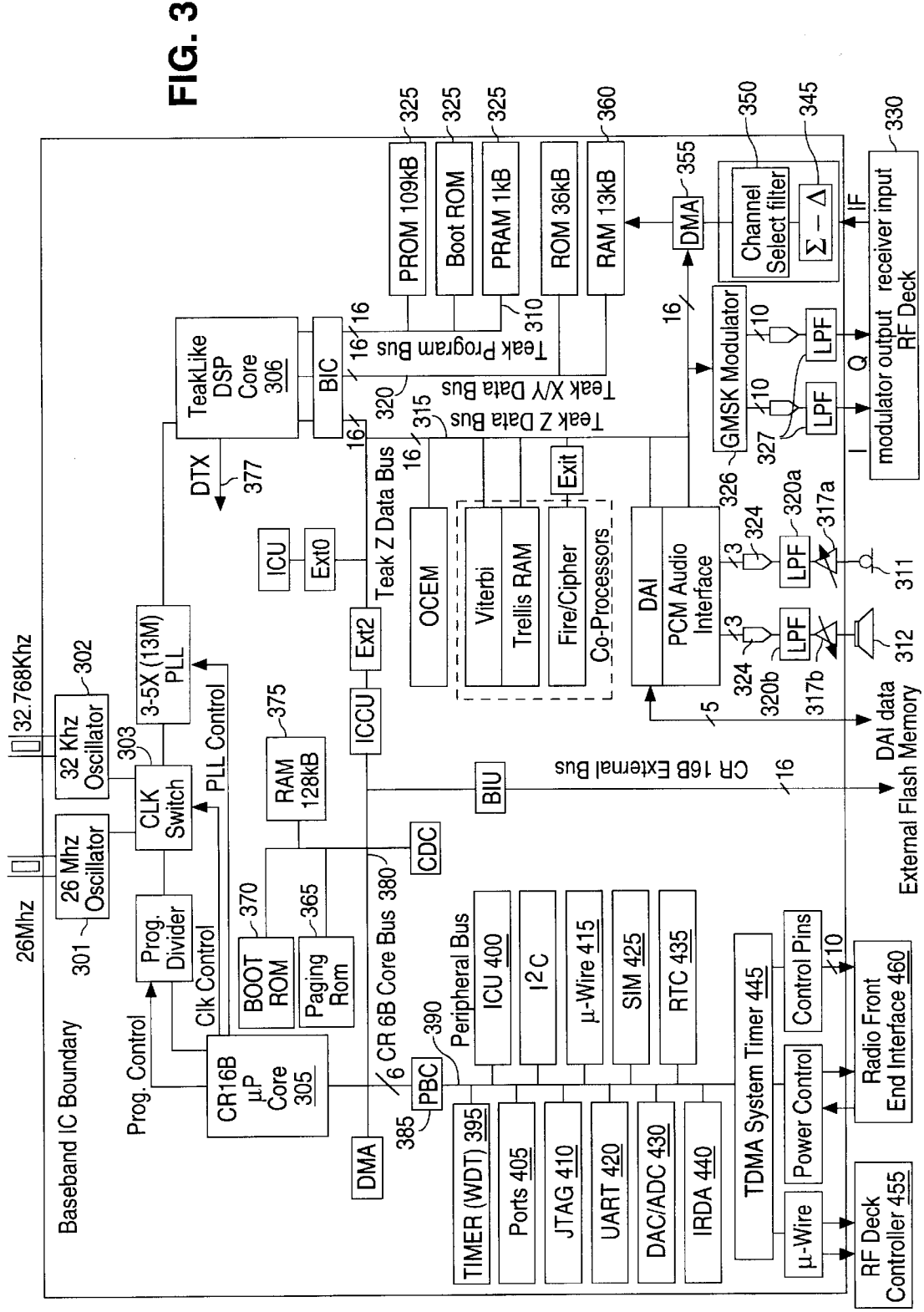
FIG. 3 is a block diagram of a mobile station in accordance with the claimed invention.
Figure 4:
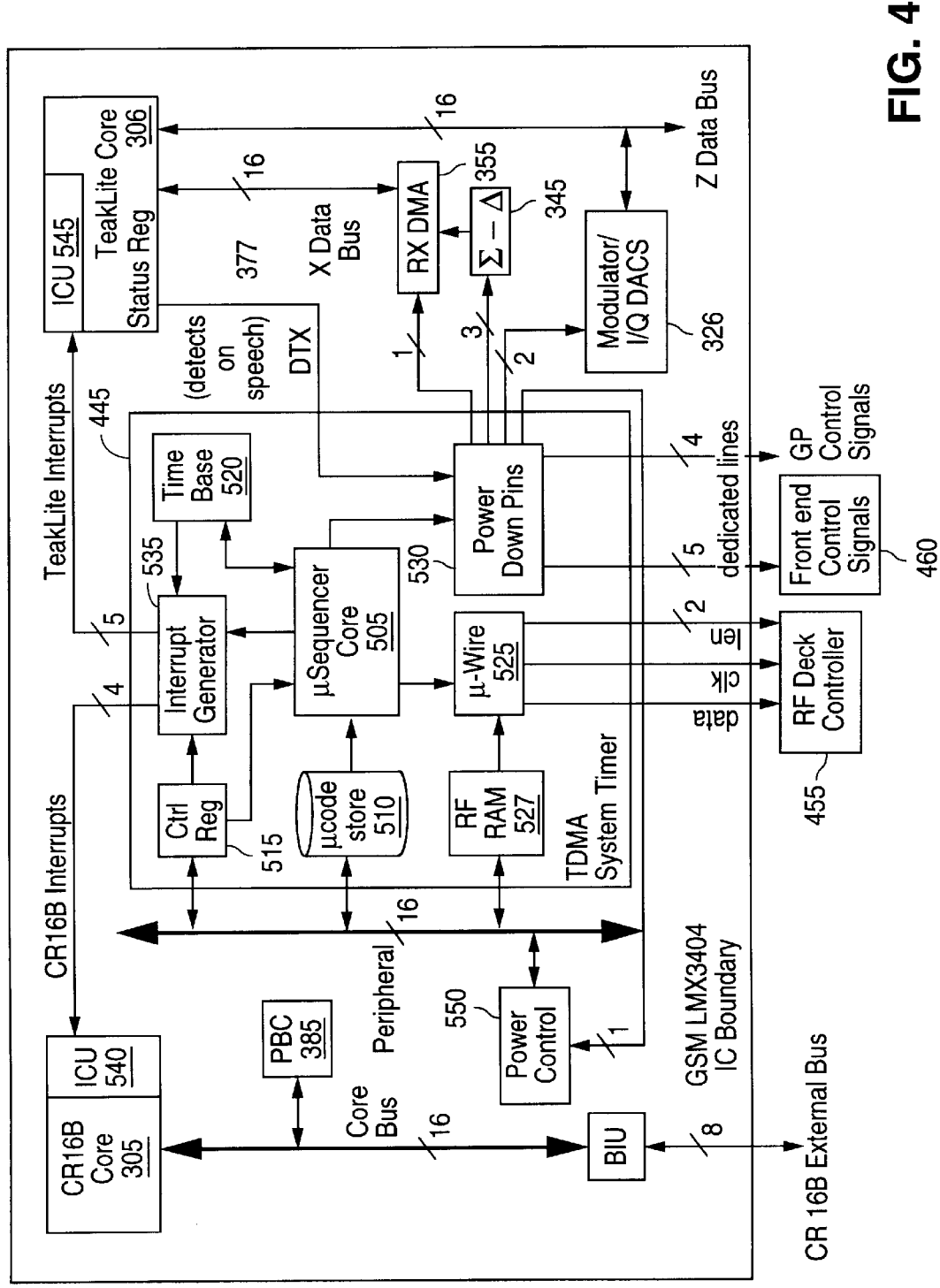
FIG. 4 is a block diagram of an exemplary system timer coprocessor in accordance with the claimed invention.

Referring now to FIG. 3, there is illustrated a block diagram of the architecture of a mobile station, referenced generally by the numeric designation 300, configured to operate in a time division multiple access (TDMA) environment. The mobile station 300 includes a microprocessor 305, such as a model CR-16 (Compact RISC 16-bit) from the National Semiconductor Corporation, and a digital signal processing (DSP) core 306.

The timing for the mobile station is maintained by a dual clock module. The dual clock module includes a high frequency clock 301 and a low frequency clock 302 controlled by a dual clock switch 303. The high frequency clock runs on a 26 MHz crystal oscillator and provides accurate, high resolution timing. The low frequency clock 302 runs on a 32.768 Khz oscillator, however, due to the lower frequency, consumes considerably less power.

DSP Core Side

During the voice communication mode, the DSP core 306 handles the baseband and audio processing by preparing audio signals received from a microphone 310 for transmission and preparing audio signals received from the base station for output to a speaker 312, thereby permitting the user to engage in a voiced telephone conversation. The DSP Core 306 is associated with a program bus 310, and a plurality of data busses. The program bus 310 provides high speed access to program memory modules 325 which store various programming instructions for the DSP Core 306. The data busses have associated peripheral interfaces which allow audio I/O peripherals and baseband radio data transmit and receive peripherals to interface to the DSP core. The DSP Core 306 also supports Discontinuous Transmission (DTX) with DTX output 377. The DTX operation is described in further detail below.

The audio I/O data bus peripheral interface 315 provides access to the microphone 311 which converts sound to audio signals and the speaker 312 which converts audio signals to sound. The audio signals from the microphone 310 are forwarded to a input programmable gain amplifier 317a followed by an input low pass anti-aliasing filter stage 320a and then received by a vocoder 324. Audio signals output to the speaker 312 are received from an output programmable gain amplifier 317b which receives the signals from an output low pass reconstruction filter 320b. The vocoder 324 is optimized to digitally represent or decode speech with appropriate error correction to assure accuracy. In accordance with GSM specifications, the vocoder 324 represents or decodes 20 ms samples of speech with 8 57 bit blocks. Two of the 57 bit blocks are transmitted/received during the data blocks 205 of each time slot 200 when the mobile station 300 is in active mode.

The baseband radio data transmit peripheral interface 315 provides access to a modulator 326 for modulating the data with a selected modulation scheme. In accordance with ETSI this scheme is GMSK for GSM/GPRS and 3Π/8 offset 8-PSK for EDGE. The modulated signal is passed through a low pass reconstruction filter 327 and output to a radio frequency (RF) deck 330 for upconversion to a selected carrier frequency.

The baseband radio data receive peripheral interface 320 provides access to signals received by the mobile station 300 from a RF deck 330. The signals are input from the receiver to a sigma-delta converter 345, a digital quadrature downconverter and a channel select filter 350. The filtered signal is then captured in a Direct Memory Access (DMA) 355 which stores the signal into DSP random access memory (RAM) 360.

Microprocessor Side

The microprocessor 305 is connected to a paging ROM 365, boot ROM 370, RAM 375 and Flash via a system bus 380. The paging ROM 365 stores programs for various routines for execution during the paging mode while the boot ROM 370 stores routines for execution during the power up boot sequence. The RAM 375 is used for storing information for various purposes, such as storing program variables, stack and parameters. The Flash memory is used for storing the wireless application code.

The system bus 380 also connects the microprocessor 305 to a peripheral bus controller 385. The peripheral bus controller 385 is an interface between the system bus 380 and a peripheral bus 390. The peripheral bus 390 is connected to various peripheral devices dedicated to the microprocessor 305. The peripheral devices can include a timer 395, an interrupt control unit 400, ports 405, a JTAG 410, a microwire 415, a UART 420, a subscriber identity module (SIM) 425, analog/digital digital/analog converters (DAC/ADC) 430, a real time controller 435, and an infrared data port 440. Additionally, the peripheral bus 390 provides access to a system timer coprocessor 445.

System Timer Coprocessor

The system timer coprocessor 445 outputs time critical control to a radio frequency (RF) deck controller 455, a radio front end interface 460, as well as each of the baseband components of the chipset, e.g., the modulator 326, demodulator 345, power ramping, AGC, RX channel select filtering, DMA 355 and even battery charging and battery monitoring operations. The RF Deck controller 455 requires time critical programming at resolutions exceeding the bit rate. The foregoing is difficult to achieve from the microprocessor 305. In contrast, the system timer processor 445 provides all the timing based control information with a quarter bit (T/4) resolution (1.083 Mhz=270.833 Khz*4) to permit the mobile station 300 to synchronize to the TDMA GSM network environment. The system timer coprocessor 445 is programmed via the microprocessor 305 with a program for each frame to control all the physical layer protocols and sub-system control during that frame. During the paging mode, the system timer coprocessor 445 maintains all time base knowledge, independent from the microprocessor 305. The foregoing advantageously relieves the microprocessor 305 from tedious control of all time critical tasks which allows the microprocessor 305 to run at lower speeds and consume less power. During the active mode, the system timer coprocessor 445 performs time critical tasks, advantageously relieving the microprocessor 305 of the foregoing tasks.

Figures 1, 2A:
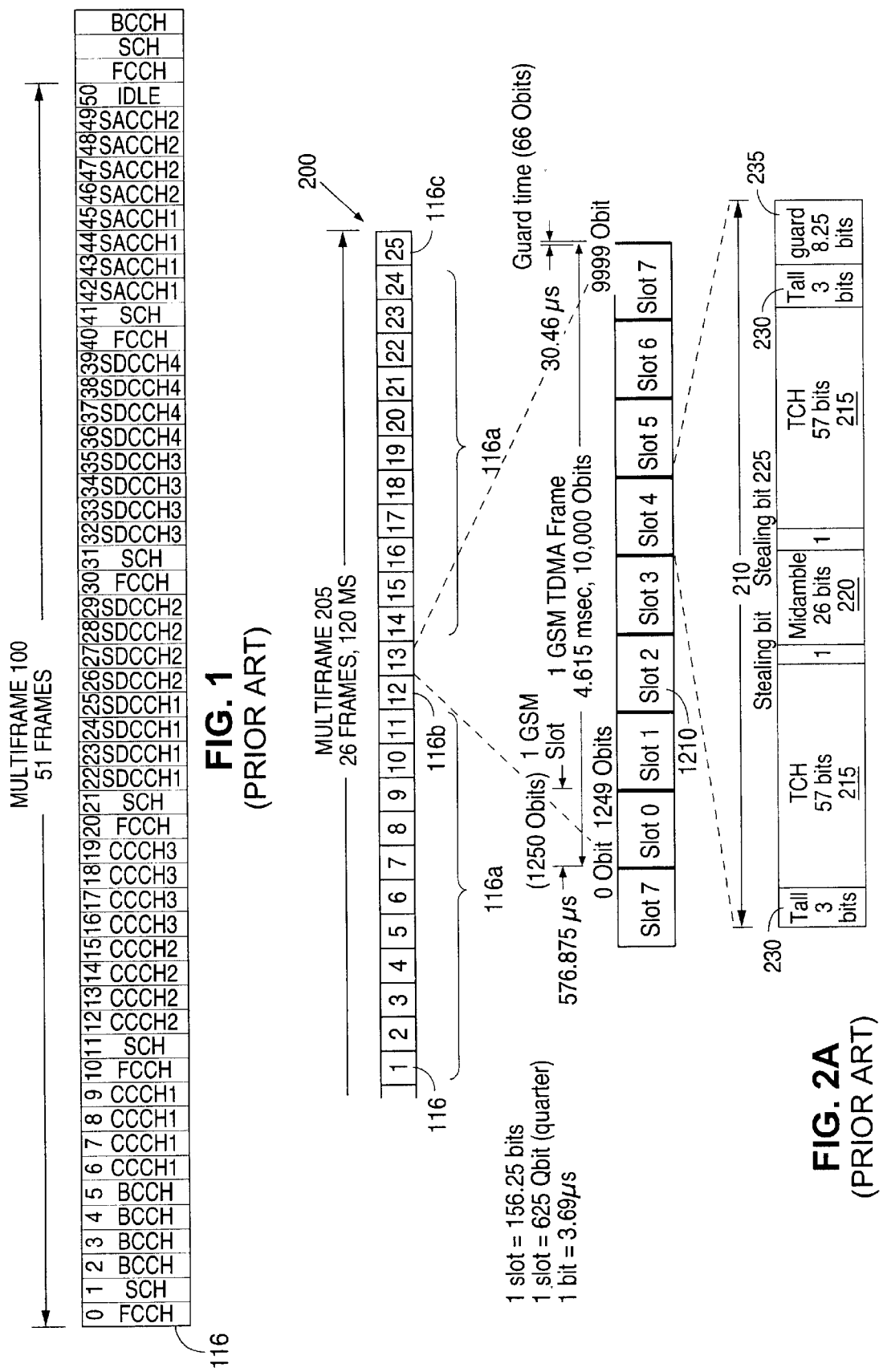
FIG. 1 is a block diagram of a common channel.
FIG. 2A is a block diagram of an exemplary traffic channel.
Figure 2B:
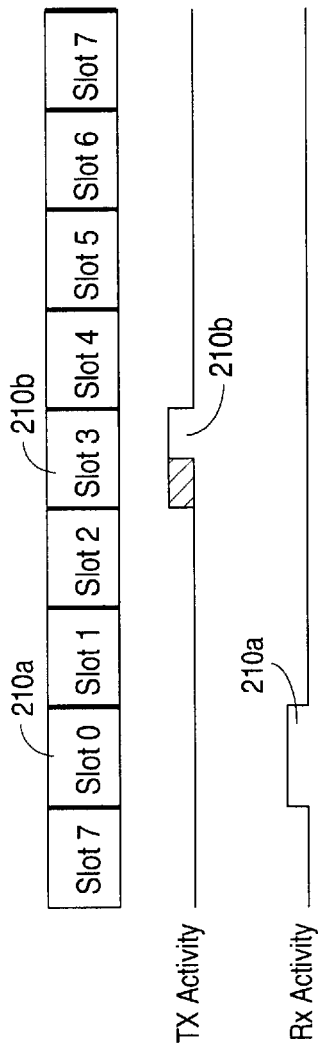
FIG. 2B is a block diagram of describing the receive and transmit periods for a mobile station.
Figure 5:
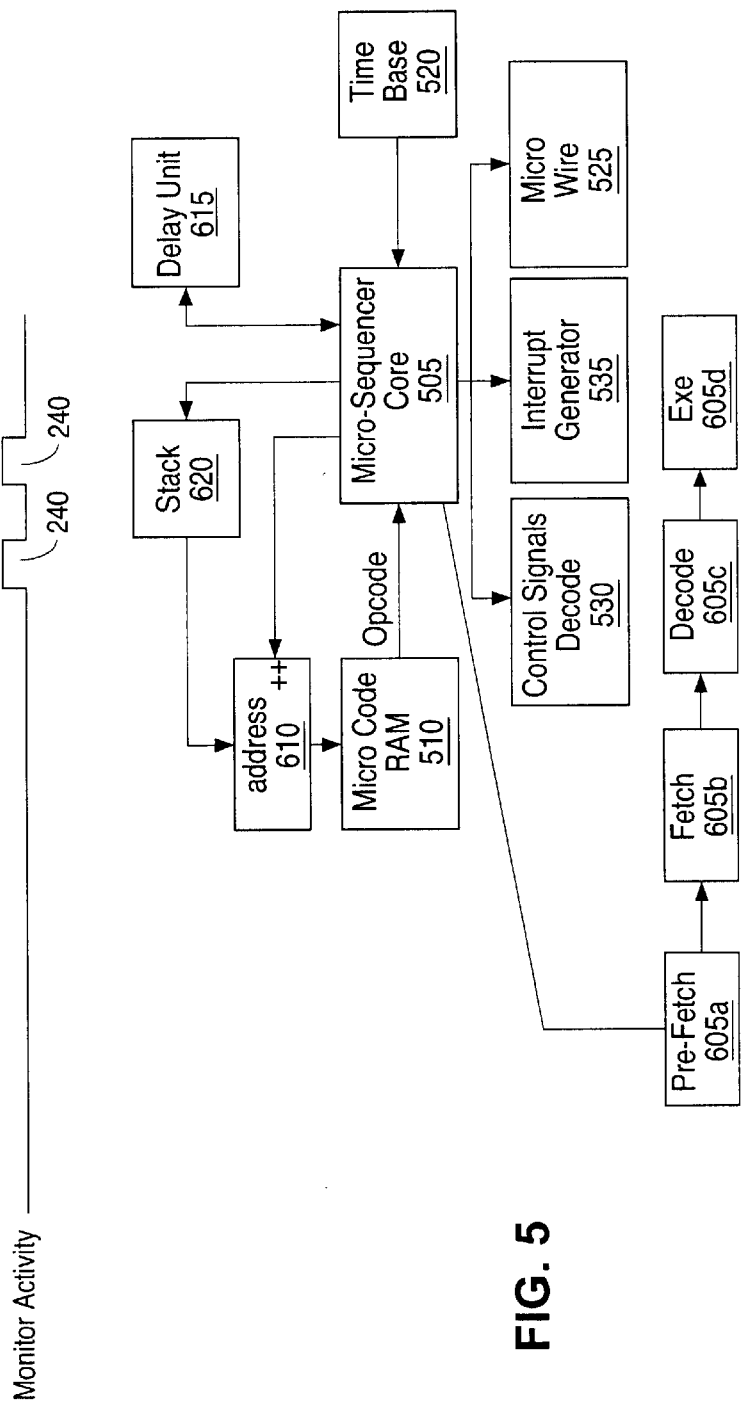
FIG. 5 is a block diagram of the microsequencer architecture in accordance with the claimed invention.

Referring now to FIG. 5, there is illustrated a block diagram of an exemplary system timer coprocessor 445 in accordance with the claimed invention. The system timer coprocessor 445 includes input interfaces, control interfaces, interrupt outputs and internal logic. The foregoing allow the system timer coprocessor 445 to control all timing control aspects of the mobile station 300 including both the data path and the control elements, e.g., the RF Deck controller 455, the Radio Front End 460, a power ramp controller 550 and control of other baseband sub-blocks.

The system timer coprocessor 445 includes a microsequencer 505 and microcode RAM 510 and RF RAM 527.

The microcode RAM 510 stores the frame program, and microcode, while the microwire RAM stores data referred to by addressed variables in the frame program. The frame program stored in the microcode RAM 510 is executed by the microsequencer 505. The system timer also includes a set of control registers 515. The control registers 515 are used to configure modes and control the operation of the system timer coprocessor 445. The control registers 515 includes a program counter, a frame count register, a status register, sleep timer register, frame split address register, a DTX enable on-chip register, and a DTX enable off-chip register. The function and operation of the individual control registers 515 are described in greater detail below.

The clock for the microsequencer 505 is provided by a time base unit 520. The time base unit 520 provides one-quarter GSM bit rate (quarter bit) or 1.083 MHz timing resolution and runs off of the high frequency clock 301. The quarter bit timing resolution allows for execution of the receive, transmit, and monitor subroutines at precise alignment with the GSM timings. The time base unit 520 handles the timing advance, handoffs and slot adjustments. The timing advance is a time offset period to compensate for the signal propagation time. The system timer coprocessor 445 also includes an interrupt generator unit (IGU) 535 for sending interrupts to both the microprocessor 305 and the DSP Core 306 via an interrupt control unit (ICU) 540 at the microprocessor 305 and an ICU 545 at the DSP Core 306.

The microsequencer 505 effectuates the receive burst, the transmission burst, and the monitor cycle by controlling the RF Deck controller 455 and the radio front end interface 460. The microsequencer 505 controls the RF Deck controller 455 by transmitting byte instructions over the microwire serial interface which control the RF Deck 330. The microsequencer 505 controls the radio front end interface 460 with a set of power down pins 530. The power down pins 530 are also used to control on-chip elements such as the modulator 326, the sigma-delta modulator 345, power ramp controller 550, AGC, RX filtering, and the DMA 355.

Microsequencer

Referring now to FIG. 5, there is illustrated a block diagram of the microsequencer 505 architecture. The microsequencer 505 has a four stage pipeline 605 which includes a pre-fetch stage 605a, a fetch stage 605b, a decode stage 605c, and an execution stage 605d. The pre-fetch stage 605a controls the memory signal setup and interface and applies the correct address to the microcode RAM 510. The fetch stage 605b fetches the instruction from the microcode RAM 510 at the memory location determined by the Pre-fetch stage 605a into an instruction register. The instruction in the instruction register is decoded by the Decode stage 605c, and upon decode, signals are sent to appropriate engines of the execution stage 605d for execution.

The execution stage 605d is a parallel unit containing five independent engines. The engines include an address generation unit 610 and delay unit 615. Additionally, the microwire 525, the interrupt generation unit 530, and the power down pins 535 form engines of the execution stage 605d. The address generation unit 610 determines the address of the instruction to be executed by the microsequencer 505 and handles a stack 620, a program counter register in the control registers 515, and implements jump to subroutine (JSR) instructions, return from subroutine instructions (RTS), and absolute jump (JMP) instructions. The stack 620 is a data structure used to store context information during interrupt recovery or returns from sub-routines. The delay unit 615 is used to stall the pipeline 605 for a predetermined delay period.

Figure 6:
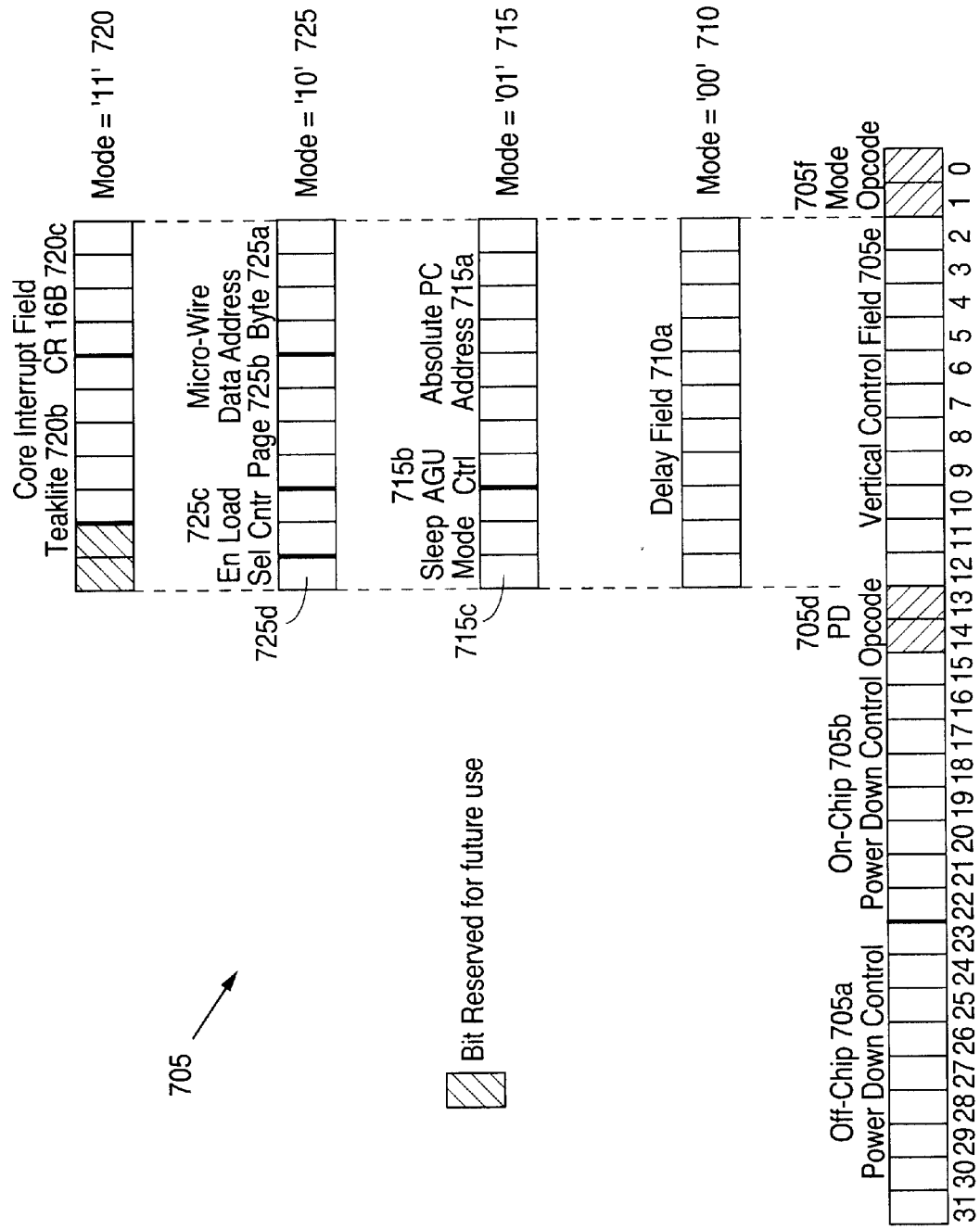
FIG. 6 is a block diagram of a microcode instruction in accordance with the claimed invention.

Referring now to FIG. 6, there is illustrated a block diagram of a microcode instruction, referenced generally by the numeric designation 705. The microcode instructions 705 are stored in the microcode RAM 527. Each microcode instruction 705 is encoded in a 32 bit opcode which is both vertically and horizontally encoded. The microcode instruction 705 includes an 18 bit power down control signal field, which is divided into an off-chip power down control signal field 705a, and an on-chip power down control signal field 705b, a two bit power down mode field 705d, an 11 bit vertical control field 705e, and a two bit mode opcode 705f. The bits of the vertical control field 705e control four of the execution stage pipeline 605d engines, namely the Delay Unit 615, the microwire 525, the address generation unit 610, and the interrupt generator unit 535, depending on the two bit mode opcode 705f. Table 1 is an exemplary table setting forth the execution stage pipeline 605d engines with the corresponding two bit mode opcode 705f. Each instruction requires only a quarter-bit execution time.

TABLE 1

| Two-bit opcode | Function |
| --- | --- |
| 00 | Selects the Delay Unit |
| 01 | Selects Address Generation Unit, Program Counter, and Sleep Mode Fields |
| 10 | Selects Microwire Data address and control fields |
| 11 | Selects Interrupt Generation Unit |

In the first mode 710, indicated by a mode opcode 00, the vertical control field contains a delay field 710a for storing a delay period for loading into the delay unit. The delay field 710a is 11 bits wide allowing for a delay of 2047 quarter bits or 511 3 bits. This delay is added to the fetch, decode, execution delay of one quarter bit so the entire delay from delay opcode fetch to next opcode fetch is 2048 quarter bits, or 512 bits.

In the second mode 715, indicated by a mode opcode 01, the vertical control field contains an address field 715a, an address generation unit field 715b, and a sleep mode field 715c. The opcode 01 indicates that the instruction is an instruction which alters the program flow, for example, a JSR, JMP, or RTS. The address generation unit field 815b indicates whether the instruction is a JSR, JMP, or RTS. A JSR results in jumping to the new address, however, the current post incremented program counter register value is pushed onto the stack. The program counter register value can then be pulled from the stack and loaded into the program counter register during an RTS instruction. A JMP permanently alters the flow of the program by jumping to the new address, without storing the current post-incremented address. TABLE 2 is an exemplary table setting forth the types of jump instructions and the corresponding address generation unit field code 715b.

TABLE 2

| Instruction | AGU Field Code |
| --- | --- |
| JMP | 00 |
| JSR | 01 |
| RTS | 1X (X = Don't Care) |

During a JMP or JSR, the address stored in the address field 715a is loaded into the address generation unit and overwrites the post-incremented program counter address. In the case of the JSR, the overwritten post-incremented program counter address is pushed onto the stack and the stack pointer is incremented. During a RTS, a stack pop operation is performed on the stack and loaded into the address generation unit which overwrites the post-incremented program counter address. The stack pointer is then decremented.

Additionally, a single bit is dedicated to a sleep mode field 715c. When the sleep mode field bit 715c is set, the microsequencer shuts down everything but the time base unit, until the time base unit generates an internal sequencer interrupt causing the microsequencer to wake up. The program counter and stack pointer are set to 0, depending on the mode of operation, and any active signals in the power down fields retain their current state.

In the third mode, indicated by mode 720 opcode 11, the vertical control field contains a DSP interrupt word 720b and a microprocessor interrupt word 720c for generation of interrupts by the interrupt generator. The DSP interrupt word 720 contains an interrupt code for the DSP Core 306, corresponding to 32 possible interrupt codes. In the microprocessor interrupt word 720c, each of the bits correspond to a particular interrupt for the microprocessor 305. Accordingly, in one instruction, the microsequencer core 505 can cause one of the 32 possible interrupts to the DSP Core 306, and up to four interrupts to the microprocessor 305. Interrupts can be generated to either core, or both cores simultaneously with a single instruction. Amongst the interrupts to the microprocessor 305 is the frame tick interrupt, indicating the start of an upcoming frame 116. The foregoing frame tick interrupt can also be generated by the time base unit 520, as will be described in greater detail below. The receive slot interrupt to the DSP Core 306 is among the 32 possible interrupts that can be asserted in an instruction.

In the fourth mode, 725, indicated by opcode 10, the vertical control field addresses byte(s) in the RF RAM 510 for transmission to the RF Deck Controller 455 via the serial microwire 525. The vertical control field 705e includes a byte address 725a, a page address 725b, a load counter 725c, and a device enable select bit 725d. The page address 725b is indicative of a particular page of RAM in the RF RAM 510, while the byte address 725a indicates a particular byte within the page of RF RAM 510. The load counter 725c indicates how many bytes, beginning with the byte referenced by the page 725b and byte address 725a, are to be transmitted by the serial microwire 525.

The microwire 525 sends output signals to the RF Deck controller 455, thereby controlling the RF Deck. The signals output to the RF Deck Controller 455 includes various phase lock loops, LNA modules, AGC stages and LDOs. The output signals can be mapped to various control parameters based on a number of schemes. For example, TABLE 3 is an exemplary map of the output signals based on a hybrid coding scheme wherein bits 0 . . . 2 are associated with a particular control category, and wherein bits 3 . . . 23 are mapped as indicated.

| | 23 | 22 | 21 | 20 | 19 | 18 | 17 | 16 | 15 | 14 | 13 | 12 | 11 | 10 | 9 | 8 | 7 | 6 | 5 | 4 | 3 | 2:0 |
|---|---|---|---|---|---|---|---|---|---|---|---|---|---|---|---|---|---|---|---|---|---|---|
| Power Control | | | | | | | | | | | | | | | | | Ldo | Tx syn | IF RF syn | RF | Rx | 000 |
| Gain Control | | | | | | | | | | | | | VGA gain (6 dB step) | | | | VGA gain (1 dB step) | | IF amp | LNA | | 001 |
| N-Counter RF PLL | | gsm mo | RF vco | | | | | | N count value | | | | | | | | | | Fractional Numerator | | | 010 |
| IF PLL control | Ipo | sync ref | Pwr Mo | PD | Rst | | R count value | | | | | | | | N count value | | | | | | | 011 |
| R-counter RF PLL | | Out2 | | Out1 | Ipo | Pwr Mo | PD | Rst | | | R count value | | | | | | | | Fractional Denominator | | | 100 |
| Wide band PLL | | Filter Adjust | | | Ampl adjust | | | | Phase adjust | | ipo | | PD | | R-count | | N-count | | | | | 101 |
| Misc. control | | | | | | | | | Activate LDOs | Activate PLLs | | Activate TX blocks | | Activate VCOs | | Activate RX blocks | | | | | 110 |
| Reserved - Test | | | | | | | | | | | | | | | | | | | | | | 111 |

The foregoing instruction permits transmission of multiple bytes via the microwire 525. However, due to the fact that the microwire 525 transmits a single byte per quarter bit time period, transmission of multiple bytes require additional time periods. During the additional time periods, microinstructions 705 transmitting further data via the microwire 525 cannot be executed. Any following microinstruction 705 for transmitting data via the microwire 525 results in a resource contention. Wherein a resource contention occurs, the microwire 525 detects the resource contention. Detection of the resource contention by the microwire 525 causes the microsequencer 505 to set a bit in one of the control registers 515, the status register, and to generate an interrupt to the microprocessor 305. During the microprocessor 305 response to the interrupt, the set bit in the status register 515 is indicative of the resource contention.

The foregoing resource contention can be prevented by insertion of a delay microinstruction 705 immediately following the microwire 525 transmit instruction 705. Although insertion of a delay microinstruction 705 prevents the resource contention, insertion of a delay microinstruction 705 increases the number of microinstructions 705 in the frame program, resulting in higher microcode RAM 510 requirements.

Alternatively, the contents of the load counter 725ccan be reduced by one and the resulting value can be automatically loaded by the microwire execution unit into the delay unit 615 at the end of the microwire instruction. Insertion of the resulting value of the load counter 725c into the delay unit 615 results in a delay for the period that the microwire 525 transmits additional bytes. Additionally, the foregoing does not require insertion of additional microinstructions 705, thereby reducing the size of the frame program and microcode RAM 510 requirements. The value of the load counter 725c reduced by one is automatically loaded into the delay unit 615 at the end of the microinstruction 705, wherein the least significant bit of the byte address 725a is one. Wherein the byte address 725a is zero, the delay unit 615 is not loaded with the foregoing value.

It is noted that certain subroutines may use relative addressing to allow for portable program code and take full advantage of the sequencer architecture. In such instances, the page address of the RF RAM 527 is set outside the subroutine. Therefore, the subroutine must be able to refer to a previously set page address, without explicitly containing the page address in the instruction. To allow for this, a certain page address, e.g., page address 0×1111 is defined as a null page address refers to the previously set page-address. Therefore, any time the page address 720*b* contains 0×1111, the current page is used.

Additionally, immediately prior to the subroutine call, the page address may be specified without transmission of any bytes by the serial microwire 525. The foregoing is supported by placement of the page address in the page address field 725*b*, and placement of 0×00 into the load counter 725*c*. Placement of the 0×00 in the load counter 725*c* results in 0 bytes transmitted while the page address variable of the RF RAM 527 is updated.

Additionally, the RF RAM 527 can be addressed in a dual bank mode. The RF RAM 527 can be divided into two banks at a certain page address. The two banks are used in alternating fashion. During frame n, the frame program addresses memory locations in the first bank while during the next frame, n+1, the frame program addresses the memory location in the second bank. The dual bank mode is indicated by a bit in the configuration register of the control registers 515. The specific bank of the RF RAM 527 is indicated by another bit in the configuration register. At the end of each frame, the bit indicating the bank of the RF RAM 527 is toggled thereby alternating the RF RAM 527 banks.

The banks are addressed as relative offsets to the starting address for each bank. For example, wherein RF RAM 527 contains 16 pages, 0 . . . 15, and is divided into two equal portions, the first bank is addressed relative to page 0 while the second bank is addressed relative to page 8. The foregoing permits frame programs to be written and executed independent of which bank of the RF RAM 527 is used. Each microinstruction 705 also controls the power down pins 530, independently and concurrently with any one of the other four execution stage engines. The power down pins 530 controls components located both on-chip sub systems as well as front end components, such as the power amplifier, the Tx/Rx switch, and the LNA module.

The on-chip power down control field 705*b* includes eight bits, wherein each of the eight bits is associated with a particular function on the chipset. TABLE 4 describes an exemplary allocation of the bits of the on-chip power down control field 705*b* with the functions associated therewith.

TABLE 4

| Signal | Opcode bit number | Function |
|---|---|---|
| TXWIN | 15 | Transmit window. The rising edge enables the modulator, and the falling edge indicates the end of the modulation. This signal is also used to generate the GATEM signal for gating the modulator clocks. |
| MDAC | 16 | Enable signal for I/Q transmit DAC's. At leading edge DAC will go to reset state. At falling edge DAC is left at the last value written. |

TABLE 4-continued

| Signal | Opcode bit number | Function |
|---|---|---|
| Ramp | 17 | Enable the Power ramping control circuit. |
| RxDMA | 18 | Enable the RxDMA to receive samples from the receive sigma-delta. |
| Sigma-Delta_en | 19 | Enable the receive sigma-delta to start the conversion of the received IF signal from the RF IC. |
| Rx_Filter_Sel | 20 | Receive filter select control. This either selects the normal 81 Khz passband receive filter or the narrower FCCH receive filter. |
| AGCE | 21 | Enable the Fast AGC circuitry in the sigma-delta. |
| Dual_Xtal_en | 22 | Enable the dual crystal clock switch mechanism for low power control. |

The off-chip power down control field 705*a* includes nine bits, wherein each of the nine bits is associated with a particular function. TABLE 5 describes an exemplary allocation of the bits of the off-chip power down control field 705*a* with the functions associated therewith.

TABLE 5

| Signal | Opcode bit number | Function |
|---|---|---|
| PA_EN | 23 | Controls PA_En and DRV_En. This is a separate control from Tx_En so the PA can be turned on after the Tx frequency is stable. |
| TX/RX_SW | 24 | Used to control Tx/RX pin diode. |
| LNA_SEL | 25 | For multi-band mode control of the triple-band LNA LTCC chip. |
| RFVCO_BND | 26 | Provides band switching control for the external RE VCO. This is only needed if the internal RF VCO on the RF IC is not operational. |
| RFVCO_EN | 27 | Provides enable control for the external RF VCO. This is only needed if the internal RF VCO on the RF IC is not operational. |
| TXVCO_EN | 28 | Provides enable control for the external TX VCO. This is only needed if the external TX VCO is not programmed by the microwire. The limitation is the RF IC has only 2 external control pins. |
| LNA_EN | 29 | For multi-band mode control of the triple-band LNA LTCC chip. The limitation is the RF IC has only 2 external control pins. |
| GP_PD1 | 30 | Microwire Load_en. This can be controlled by the microwire state machine or optionally by this field directly as a general purpose power down control signal. |
| GP_PD2 | 31 | General purpose power down control signal. |

The foregoing bits of the off-chip power down control field 705*a* can control the associated functions in a number of different ways. The are 4 different opcodes which define 4 modes to control the power down signals. For example, the functions can be enabled directly in accordance with the bits of the on-chip power down control field 705*b* and the off-chip power down control field 705*a* can be directly loaded (load power down operation). Alternatively, the functions can be set in accordance with the bits, wherein any bit that is a 1 in the on-chip power down control field 705*a* and the off-chip power down control field 705b enables the associated function, while all 0's are treated as don't cares (set power down operation). Additionally, the function can be cleared in accordance with the bits, wherein any bit that is a 1 in the on-chip power down control field 705a and the off-chip power down control field 705b disables the associated function while all 0's are treated as don't cares (clear power down operation).

The power down opcode field 705d determines if the power down bits in the on-chip power down control field 705b and the off-chip power down control field 705a are loaded directly, set, or cleared. Additionally, the power down opcode field 705d also includes an opcode which corresponds to a NOP operation, wherein the bits of the on-chip power down control field 705b and the off-chip power down control field 705a are ignored and do not affect the associated function. TABLE 6 describes the opcode bits and the associated power down operations in an exemplary case.

TABLE 6

| OPCODE BIT 13–14 VALUES | FUNCTION |
| --- | --- |
| 00 | Selects the NOP functionality. |
| 01 | Selects the bit 'load' power down operation. |
| 10 | Selects the bit 'set' power down operation. |
| 11 | Selects the bit 'clear' power down operation. |

To directly drive both active low and active high off-chip devices connected to the Radio Front End Interface 460, the power down pins 530 transmit power down signals which are tri-stated during reset. The sequencer power down pins remain in tri-state mode while the system timer coprocessor 445 is programmed by the microprocessor 305. The first instruction the microsequencer 505 executes can be a load or set opcode to set a power down pin control register in the power down pins 530 to the appropriate state so all the devices controlled by the power down pins 530 are in the inactive state. The second instruction can be a NOP which triggers the state machine in the power down pins 530 to remove the tri-state and drive the power down signals to the level as reflected in the power down pin control register.

Directly driving both active high and active low devices in the radio front end interface 460 alleviates the need for placement of an inverter bank, thereby resulting in a smaller and more inexpensive mobile station 300 design. A pull up transistor or pull down transistor can be placed in front of the front end devices connected to the Radio Front End Interface 460, depending on whether the device is active high or active low, thereby ensuring that the devices are inactive when the power down pins 530 transmit tri-stated signals during reset. The foregoing prevents miscontrol of the front end devices, such as a power amplifier. Miscontrol of the power amplifier can interfere with the proper operation of the cellular network.

DTX (Discontinuous Transmission)

The power down pins 530 receive the DTX signal 377 from the DSP Core 306. Wherein the DTX signal 377 is high, which indicates that no transmission shall take place because the Voice activity detector (VAD) of the vocoder has determined that no voice is present for transmission, therefore, the power down pin 530 outputs which enable the transmission components are masked. In the foregoing manner, the transmission of unvoiced signal is avoided.

Figure 7:
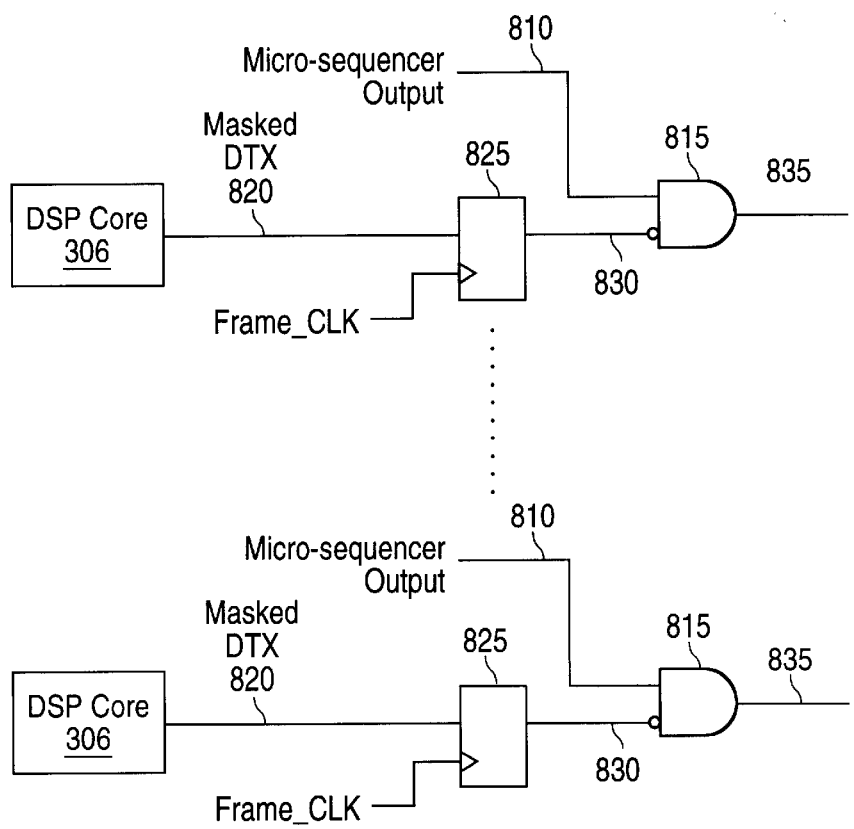
FIG. 7 is a block diagram of a DTX architecture in accordance with the claimed invention.

Referring now to FIG. 7, there is illustrated a block diagram of the DTX, power down pins 530. For each power down pins 530 output, a particular input is received and associated therewith by the power down pins 530 from the microsequencer 505. The power down input is received at an AND gate 815. The output of the AND gate is output from the power controller to the radio front end interface 460 and other radio components.

Additionally, for each power down pin 530 output, a particular masked DTX 820 is received and associated therewith. It is noted that certain power down pin 530 outputs are associated with receive components which should not be inhibited during periods where no voice is detected from the mobile station 300 user. The receive components which are not to be inhibited are identified by two of the control registers, a DTX Enable On-chip register and a DTX Enable Off-chip register.

The DTX enable mask on-chip register and DTX enable off-chip register each include a plurality of bits, wherein a particular one of the bits is associated with a particular one of the power down outputs. Wherein a bit is 0, the power down output associated therewith, does not control a radio transmission component and the output should not be inhibited during period where no voice is detected from the user of the mobile station 300.

During periods where no voice is detected from the mobile station 300 user, the DSP core 306 masks the DTX signal 377 with the DTX enable mask on-chip register and DTX enable off-chip register. A resulting masked DTX signal 820 is low, wherein the DTX signal 820 is associated with a power down pin 530 associated with radio receive component. A resulting masked DTX signal 820 is high, wherein the DTX signal 820 is associated with a power down pin 530 associated with a radio transmission component.

Each masked DTX signal 820 is received by a latch 825 which is clocked at the frame rate. Accordingly, the masked DTX signal 820 is output once per frame. The clocked, output, a clocked DTX masked signal 830, is received is inverted by the AND gate 815. The output of the AND gate is the power down pin 530 output associated with the microsequencer output 810.

Frame Programming

A plurality of the foregoing microinstructions can together form a frame program executable by the microsequencer 505. Execution of the frame program by the microsequencer 505 causes the system timer coprocessor 445 to effectuate the GSM TDMA protocol by selectively enabling and disabling the receiver and transmitter components of the mobile station 300. The receiver and transmitter components of the mobile station 300 are enabled and disabled by the output signals from the serial microwire 525 and the power down pins 530.

However, the system timer coprocessor 445 is strictly frame oriented and does not maintain timing for any unit larger than one frame, e.g., a 4.615 ms GSM frame. Therefore, the system timer coprocessor 445 must be provided with instructions for every frame. Because the system coprocessor 445 maintains all time base knowledge during a frame, the microprocessor 305 must be alerted at the start of each frame.

Figures 8, 10:
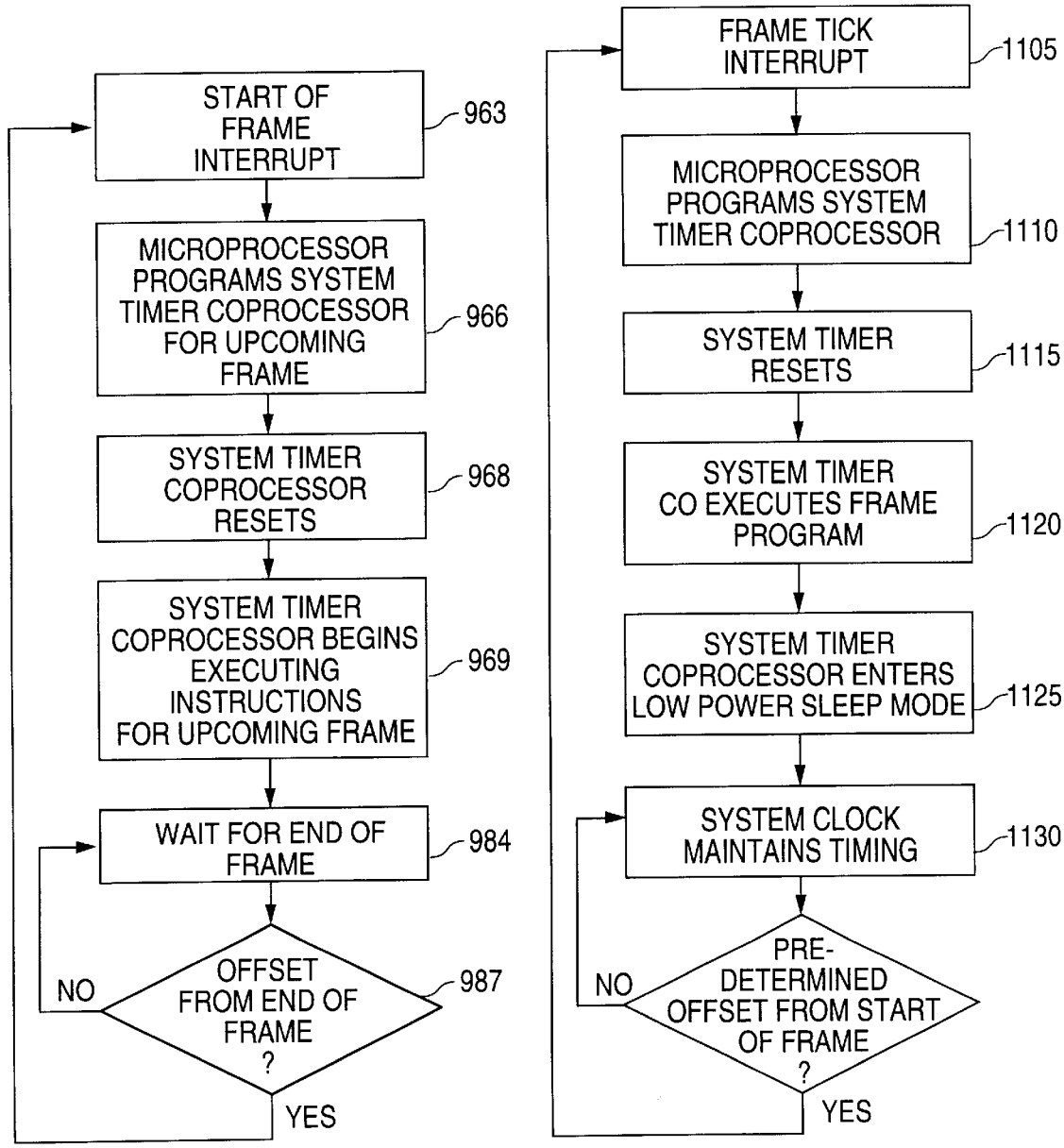
FIG. 8 is a flow diagram describing the operation of the microprocessor and the system timer coprocessor in accordance with the claimed invention.
FIG. 10 is a flow diagram describing the operation of the microprocessor and the system timer coprocessor in accordance with a first embodiment of the claimed invention.

Referring now to FIG. 8, there is illustrated an exemplary flow diagram describing the operation of the microprocessor 305 and the system timer coprocessor 445 in accordance with the claimed invention. The system timer coprocessor 445 transmits an interrupt via the interrupt generator unit 535 indicating the start of the frame (now referred to as a frame tick interrupt) at a predetermined offset preceding the start of a TDMA frame (step 963). The frame tick interrupt precedes the start of the frame because the RF Deck Controller 455 needs to be programmed several hundreds of a microseconds prior to the start of the frame to allow for PLL locking.

After receiving the frame tick interrupt, the microprocessor 305 can program the microcode RAM 510, RF RAM 527, and control registers 515 with the instructions and control data for the upcoming frame (step 966). It is noted that the system timer coprocessor 445 may repeat operations for the previous frame, as will be described in greater detail below. Wherein the system timer coprocessor 445 repeats operations for the previous frame, the microprocessor 305 leaves the frame program for the previous frame in the microcode RAM 510 for execution. Wherein the microprocessor 305 programs the microcode RAM 510, RF RAM 527, and control registers 515, the frame program is transmitted as a data burst over the peripheral bus. At the start of the frame, the microsequencer 505 receives an interrupt indicating the start of the frame (step 967) and executes the frame program (step 969). When the mobile station is in the active mode, the frame program may include instructions for providing the appropriate parameters to the RF Deck Controller, receive signal instructions for effectuating a receive burst during the receive channel, transmit signal instructions for effectuating a transmit burst during the transmit channel, and monitor signal instruction to effectuate any number of monitor cycles. Where the mobile station is in the paging mode, the frame program may include instructions for effectuating a receive and any number of monitor cycles.

After the frame program is completed, the system timer coprocessor 445 waits (step 984) for the end of the frame (step 987) and generates a frame tick interrupt (step 963) towards the end of the frame at the predetermined offset preceding the start of the next frame. The frame timing can be maintained by one of the control registers 515, a frame count register which is incremented each quarter bit, and thereby maintaining frame timing. The predetermined offset can be indicated by another one of the control registers 515, a frame tick count register. After the frame tick interrupt is generated, steps 963–987 are repeated for the next frame.

It is noted that processing consumes considerable power. Accordingly, it is preferable to reduce the number of instructions that the system timer coprocessor 445 must execute. For example, during steps 984 and 987, the system timer coprocessor 445 waits for the predetermined offset preceding the start of the next frame. Although step 984 and 487 can be implemented by executing no-op operations after the frame program (step 966) in a gadfly loop until the predetermined offset and then generate the interrupt with an appropriate instruction 705 (step 963), the foregoing increase the processing power requirements for the system timer coprocessor 445. Alternatively, after the system timer coprocessor 445 finishes the frame program, the system timer coprocessor 445 can operate in a low power sleep mode, namely with the Halt opcode, wherein the processing operations of the system timer coprocessor 445 are suspended and the quad stage pipeline clocks are suspended. The timing can be maintained by the timebase unit 520. With simple logic and considerably lower power consumption, the system clock can provide the frame tick interrupt (step 963) to the microprocessor 305. Additionally, responsive to the system clock interrupt, the system timer coprocessor can exit the low power sleep mode.

Figure 9:
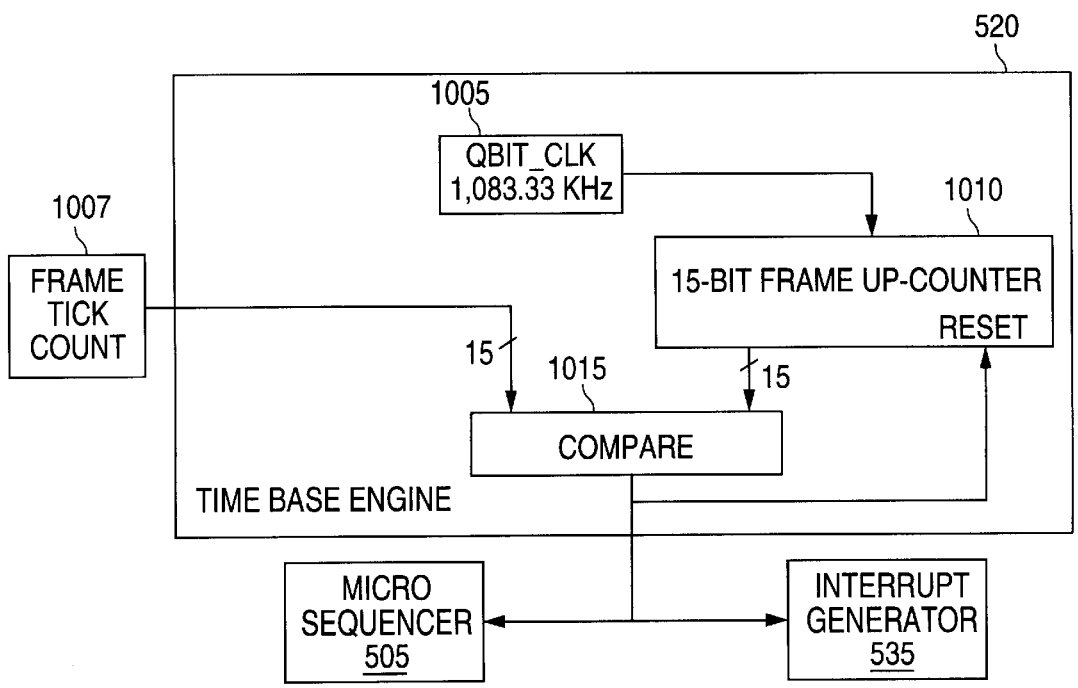
FIG. 9 is a block diagram of the time base unit in accordance with the claimed invention.

Referring now to FIG. 9, there is illustrated a block diagram of the time base unit 520 in accordance with the presently claimed invention. The time base unit 520 includes a quarter-bit clock 1005 which transmits a pulse at the quarter GSM bit rate (1,083.33 KHz) or every 923 ns. The pulse is received by a time base counter register 1010. The time base counter register 1010 is a counter which is incremented after every pulse. Accordingly, by resetting the time base counter register 1010 to 0 at the beginning of each frame, the time base counter register 1010 maintains the quarter bit count for the frame.

The time base unit 520 also receives input from a frame tick count register 1007. The frame tick count register 1007 stores a frame count, whereon a frame tick is generated. The frame tick count register 1007 input is received by a comparator 1015. When the time base counter register 1010 is equivalent to the frame tick count register 1007 the comparator 1015 causes the time base unit 520 to generate a frame tick output.

The time base unit 520 maintains the timing for the system timer coprocessor 445 and detects the end of frame. The frame tick count register 1007 can correspond to a predetermined offset to the end of the frame, wherein the predetermined offset allows time the time base unit 520 generates a frame tick output.

In addition to maintaining the timing for the system timer coprocessor 445, the time base unit 520 allows for the microsequencer 505 to enter a low power mode during each frame after execution of the frame program. As noted above, the microprocessor 305 must be alerted at a predetermined offset from the start of the frame to program the system timer coprocessor 445.

The time base unit 520 independently generates a frame tick at the predetermined offset from the start of the frame. Therefore, when the microsequencer 505 completes execution of the frame program, the microsequencer 505 can enter the low-power mode wherein no instructions are executed. When the time base unit 520 generates the frame tick, the frame tick interrupts the microsequencer 505 causing the microsequencer 505 to exit the low power mode and reset.

The frame tick interrupt can be generated by the time base unit 520 as described above, in addition to generation by microinstruction 705. The dual frame tick generation is arbitrated by an Enable Timebase Generated Frame Tick bit in the configuration register in the control registers 515. Wherein the Enable Timebase Generated Frame Tick bit is set, the Time Base Unit 520 generates the frame tick interrupt as described above. Wherein the Enable Timebase Generated Frame Tick bit is not set, time base unit 520 generation of the Frame Tick Interrupt is disabled. The foregoing results in power savings as the Frame Tick is typically generated at the end of the frame. The microsequencer 505 can enter the low power mode early and the Frame Tick is automatically generated at the appropriate time.

Referring now to FIG. 10, there is illustrated a flow diagram describing the operation of the microprocessor 305, the system timer coprocessor 445, and the time base unit 520 in accordance with the claimed invention. The system timer coprocessor 445 transmits a frame tick interrupt at a predetermined offset preceding the start of a TDMA frame (step 1105). After receiving the frame tick interrupt, the microprocessor 305 programs the system timer coprocessor 445 with the frame program for the upcoming frame (step 1110) and the system timer coprocessor 445 is initialized (step 1115). After the system timer coprocessor 445 is programmed and reset, the system timer coprocessor 445 begins executes the frame program (step 1120).

After the frame program is completed, the system timer coprocessor 445 enters a low power sleep mode (step 1125), wherein the processing operations of the system timer coprocessor 445 are suspended. The low power sleep mode can be set by an instruction, namely a halt instruction, with the sleep mode field 715c set. The time base unit 520 maintains timing (step 1130) until the predetermined offset from the start of the next frame, maintained by the frame tick count register 1007 (step 1135). At the predetermined offset from the start of the next frame, the time base unit 520 provides the frame tick interrupt (step 1105) to the microprocessor 305. Steps 1105–1135 are then repeated for the next frame. The system timer coprocessor 445 is taken out of the sleep mode when the time base unit 520 generates the internal sequencer interrupt. (step 1115).

In addition to the system timer coprocessor 445, the microprocessor can also enter a low power mode of operation. For example, pursuant to the GSM specifications, a paging mode, the mobile station may execute a maximum of 459 idle frames. During the foregoing paging cycle, the system timer coprocessor 445 can execute the same frame program and, therefore, does not require reprogramming at every frame. Accordingly, the microprocessor 305 can enter a low power mode during a predetermined number of frames. At the completion of the predetermined number of frames, the microprocessor 305 must be exited from the low power mode. To exit the microprocessor 305 from the low power mode, a count of frames is maintained by one of the control registers 515, the sleep timer register. After the predetermined number of frames has elapsed, the system timer coprocessor 445 must generate an interrupt to the microprocessor 305.

Figure 11A:
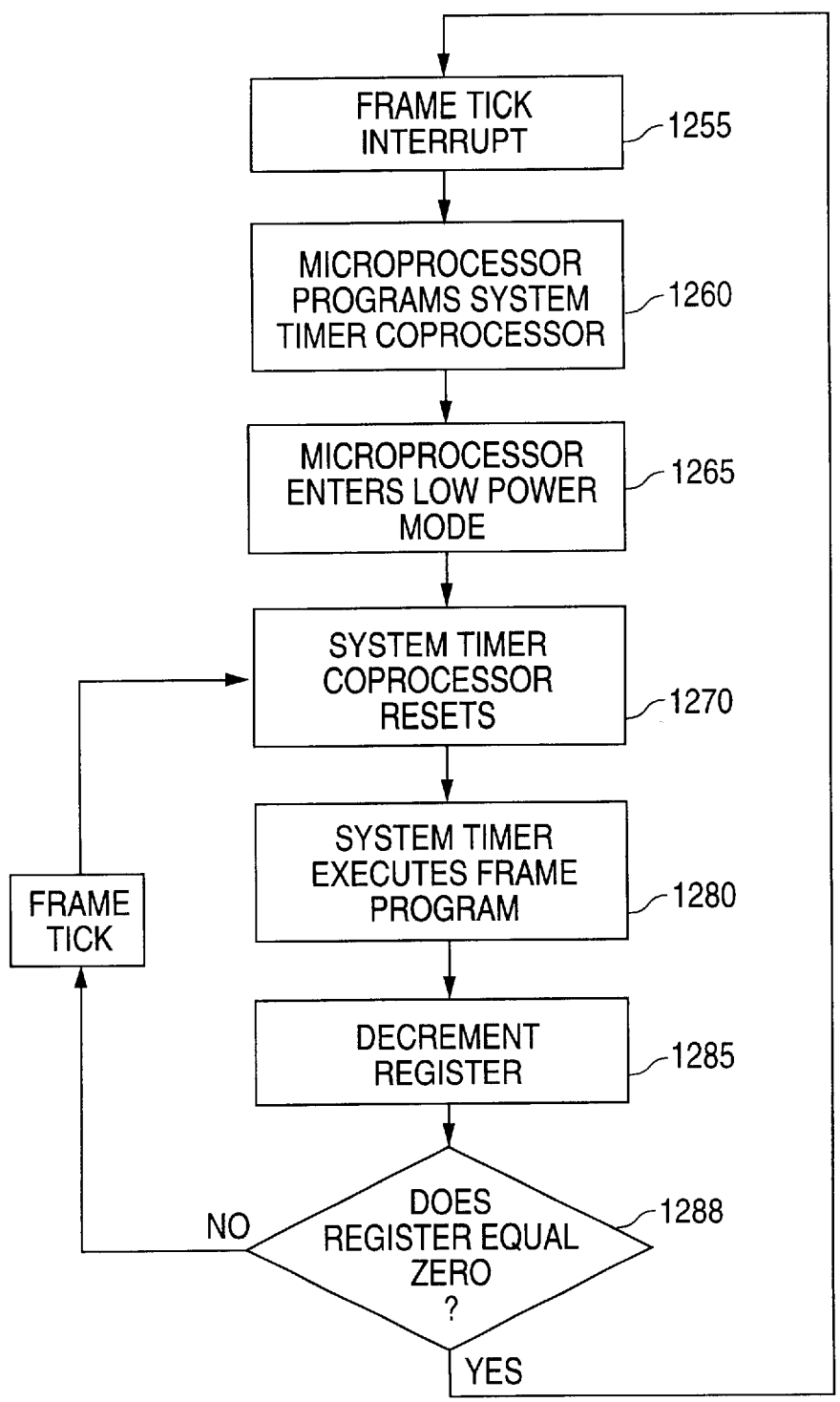
FIG. 11A is a flow diagram describing the operation of the microprocessor and the system timer coprocessor in accordance with a second embodiment of the claimed invention.

Referring now to FIG. 11A, describing the operation of the microprocessor 305, the system timer coprocessor 445, and the sleep timer register in accordance with the claimed invention. The system timer coprocessor 445 transmits a frame tick interrupt via the interrupt generation unit 535 at a predetermined offset preceding the start of a TDMA frame (step 1255). After receiving the frame tick interrupt, the microprocessor 305 loads the microcode RAM 510 with the frame program for the upcoming frame (step 1260). During step 1260, the microprocessor 305 also indicates entry into a low power mode for a number of frames to the system timer coprocessor 445 by loading the sleep timer register with number of frames (step 1260). At step 1265, the microprocessor 305 enters a low power mode. At step 1270, the system timer coprocessor 445 is initialized. After the system timer coprocessor 445 is programmed and initialized, the system timer coprocessor 445 executes the frame program (step 1280).

At the predetermined offset from the start of the next frame, the system timer coprocessor 445 a frame tick is generated by the interrupt generation unit 535 which causes the sleep timer register to be decremented (step 1285). At step 1288, wherein the sleep timer register does not equal zero after decrementing, no frame tick interrupt is generated and steps 1270–1288 are repeated. Wherein the frame counter is equal to zero during step 1288, the interrupt generation unit 535 generates the frame tick interrupt (step 1255) and steps 1255–1288 are repeated.

Dual Crystal Deep Sleep Low Power Mode

The system timer coprocessor 445 can also operate in a deep sleep low power mode, wherein the high frequency clock 301 to the system timer coprocessor 445 is disabled. However, power is still applied to the system timer coprocessor, thereby permitting the RF RAM 527, microcode RAM 510 and control registers 515 to store information and maintain state.

In the deep sleep mode, the protocol timebase reference is maintained in the timers running off the low frequency 490 clock 302 instead of in the timebase unit 520 of the system timer coprocessor 445. The state of the system timer is maintained by the microcode RAM 510, the RF RAM 527 and the control registers 515 including the timebase and PC state.

The system timer coprocessor 445 transmits an interrupt to generate exact timing control to the dual clock switch 303 for processing, such as low power crystal calibration and deep sleep mode initiation. The dual clock switch 303 transmits an enable to automatically bring the system timer coprocessor 445 out of deep sleep into an active mode of operation without intervention from the microprocessor 305, hence synchronizing the timebases and maintaining the timebase integrity of the system.

During the deep sleep mode, the lower frequency clock 302 measures a predetermined period of time as calculated by the microprocessor 305 to maintain the system time base. At the expiration of the predetermined period of time, the dual clock switch 303 switches the time base from the low frequency clock 302 to the high frequency clock 301 and the system timer coprocessor 445 is enabled.

Figure 11B:
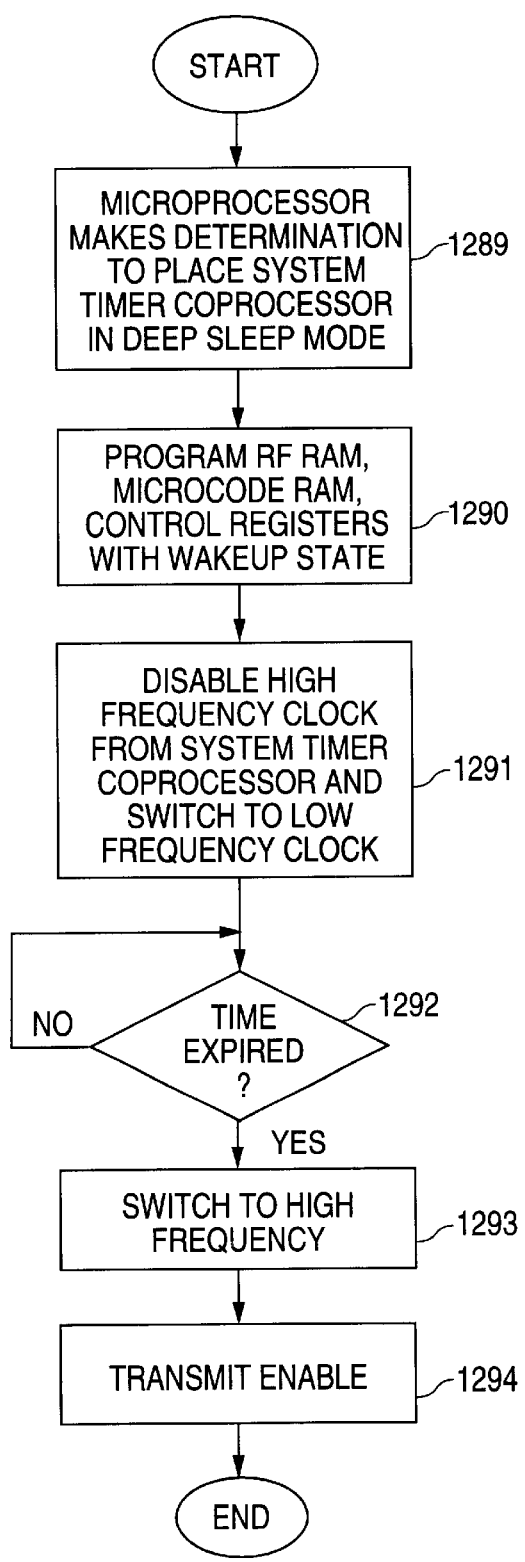
FIG. 11B is a flow diagram describing the operation of the microprocessor and the system timer coprocessor in accordance with a third embodiment of the claim invention.

Referring now to FIG. 11B, there is illustrated a block diagram describing the deep sleep low power mode of operation. At step 1289, the microprocessor 305 makes a determination to place the system timer coprocessor 445 into the deep sleep low power mode. The microcode RAM 510, the RF RAM 527, and the control registers 515 are programmed (step 1290) by the microprocessor 305 to store the wakeup state. At step 1291, the dual clock switch 303 disables the high frequency clock 302 from the system timer coprocessor 445 and switches the timebase to the low frequency clock 301. At step 1292, the low frequency clock measures a predetermined period of time. At the expiration of the predetermined period of time, the dual clock switch 303 switches back to the high frequency clock (step 1293) and transmits an enable signal to the system timer coprocessor 445 (step 1294), causing the system timer coprocessor to automatically start up in the preprogrammed wakeup state.

Double Buffering

Dual accessible microcode RAM 510 is required in the system timer coprocessor 445 in order for the microprocessor 305 to program and for the microsequencer 505 to execute the program. However, a read/write collision can occur if the microprocessor 305 overwrites a portion of the program for the current frame with the program for the upcoming frame, before the microsequencer 305 has finished completing that portion of the program for the current program. Double buffering of the frame microcode is an important architectural consideration to reduce the real time programming requirements on the microprocessor.

A read/write collision can be avoided in one of several ways. For example, as illustrated in FIG. 10, the microcode RAM 510 is programmed by the microprocessor 305 while the system timer coprocessor 445 is in the sleep mode and not executing instructions. However, the microsequencer 505 may not complete execution of the frame program prior to the frame tick interrupt. Wherein the microsequencer 505 does not complete execution of the frame program prior to the frame tick interrupt, considerable care must be taken to prevent the microprocessor 305 from causing a read/write collision.

Alternatively, the system timer coprocessor 445 can execute instructions from one portion of the microcode RAM 510 while the microprocessor 305 writes to another portion of the microcode RAM 510. Therefore, while the microsequencer 505 executes the program for frame n, in the first portion of the microcode RAM 510, the microprocessor 305 writes the program for frame n+1 in the second portion of the microcode RAM 510. At the completion of frame n, the system timer coprocessor 445 and the microprocessor 305 swap the portions of the microcode RAM 510. The microsequencer 505 executes the program for frame n+1 in the second portion of the microcode RAM 510, while the microprocessor 305 writes the program for frame n+2 in the first portion of the microcode RAM 510. The foregoing mode of programming the system timer coprocessor 445 is known as the double buffered mode.

Because the microprocessor 305 writes to a different portion from the portion read by the microsequencer 505, read/write collisions are prevented. However, programming in the double buffered mode requires knowledge of the starting address of the second portion and the particular portion being executed. Because the portions are swapped at the end of the frame, the starting address for the frame program does not necessarily begin at a predetermined reset address, e.g., 0×00. In contrast, the starting address is explicitly provided by one of the control registers 515, the frame address split register, although the address can be set as a default. Additionally, the control registers 515 include a status register storing an indicator bit which indicates whether the memory portion for the current frame is the first memory portion or the second memory portion in order to swap during the upcoming frame.

Figure 12:
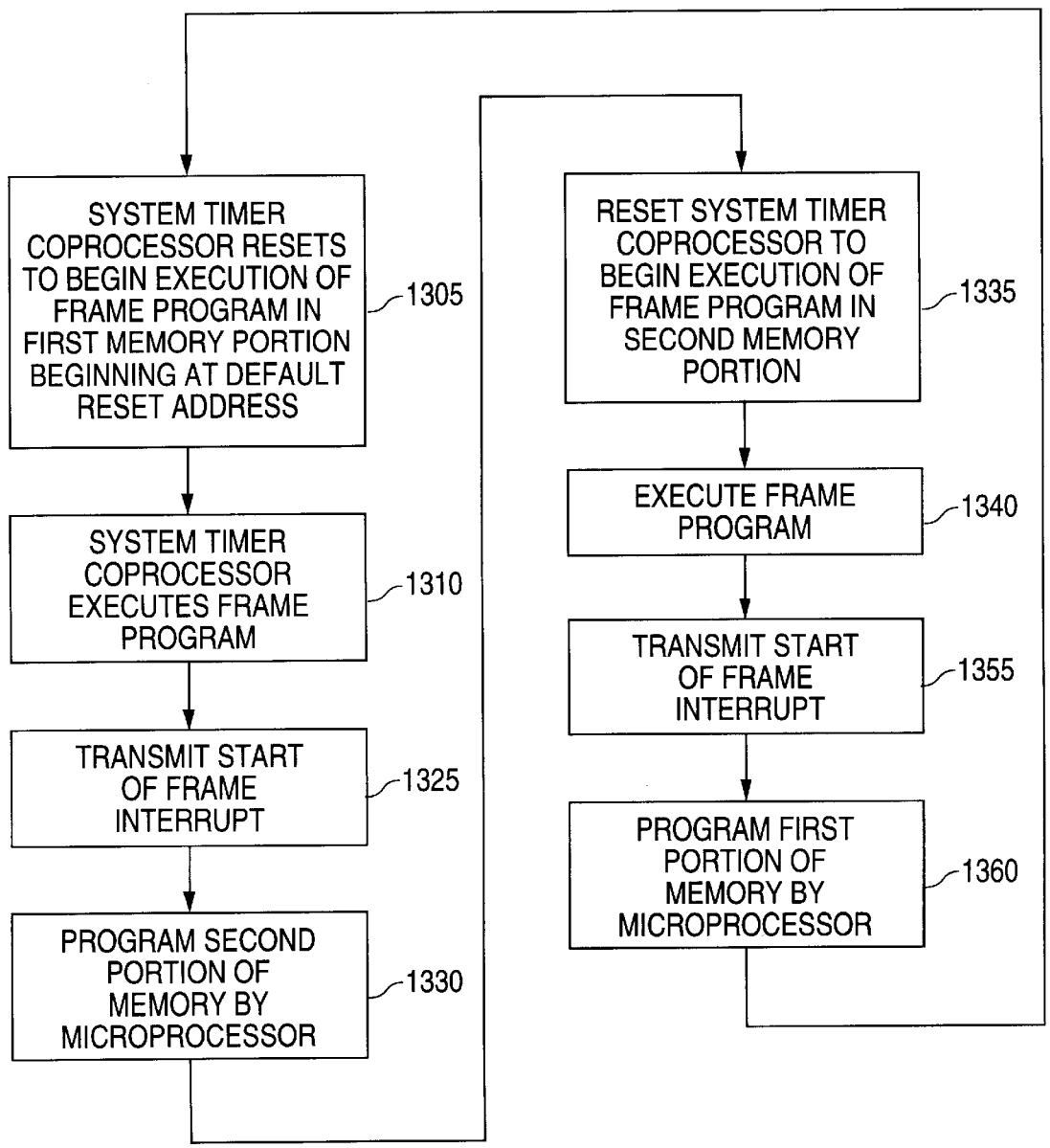
FIG. 12 is a flow diagram describing the operation of the microprocessor and the system timer coprocessor in accordance with a fourth embodiment of the claimed invention.

Referring now to FIG. 12, there is illustrated a flow diagram describing the operation of the microprocessor 305 and the system timer coprocessor 445, in accordance with the present claimed invention. At step 1305, the system timer coprocessor 445 is initialized to begin execution of the frame program stored in a first portion of the microcode RAM 510 beginning at a default reset address, e.g., 0×00. During the initialization, the indicator bit is toggled to indicate at the next frame that the second memory portion contains the frame program. The microsequencer 505 executes the frame program during step 1310. At step 1325, the system timer coprocessor 445 transmits a frame tick interrupt.

Responsive thereto, the microprocessor 305 programs the second portion of the microcode RAM 510 (step 1330). At step 1335, the system timer coprocessor 445 is initialized and begins execution of the new frame program in the second portion of the microcode RAM 510. As noted above, the microsequencer 510 is provided with the address of the second portion of the microcode RAM 510. Although the first portion of the microcode RAM 510 can be implicitly defaulted as 0×00, the second portion of the memory is provided to the microsequencer 505 by the frame address split register during step 1335. Additionally, during the initialization, the indicator bit is toggled to indicate at the frame, e.g., step 1305, that the first microcode RAM 510 portion contains the frame program.

The frame program is executed at step 1340 from the second portion of the microcode RAM 510. At step 1355, the system timer coprocessor 445 transmits a frame tick interrupt. Responsive thereto, the microprocessor 305 programs the first microcode RAM 510 portion of the system timer coprocessor 445 with the frame program for the next frame (step 1360). After the microprocessor 305 completes programming the first microcode RAM 510 portion, step 1360, the system timer is initialized (step 1305) to begin execution of the frame program stored in a first portion of the microcode RAM 510 and steps 1305–660 are repeated.

Although preferred embodiments of the present inventions have illustrated in the accompanying Drawings and described in the foregoing Detailed Description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. A method for controlling radio components, said method comprising:

executing a first instruction, said first instruction comprising a first page address and a first byte address;

fetching a second instruction, said second instruction comprising a second page address and a second byte address; and accessing a memory location associated with the first page address and the second byte address responsive to fetching the second instruction.

2. The method of claim 1, wherein accessing the memory location further comprises:

reading the memory location associated with the first page address and the second byte address responsive to fetching the second instruction.

3. The method of claim 1, wherein accessing the memory location further comprises:

writing to the memory location associated with the first page address and the second byte address responsive to fetching the second instruction.

4. The method of claim 1, wherein the second page address is a predetermined null address.

5. A system for controlling radio components, said system comprising:

a microsequencer for executing a first instruction, said first instruction comprising a first page address and a first byte address in a radio frequency random access memory (RF RAM) and for fetching a second instruction, said second instruction comprising a second page address and a second byte address; and an execution engine for accessing a memory location in the RF RAM associated with the first page address and the second byte address, responsive to fetching the second instruction.

6. The system of claim 5, wherein the execution engine writes to the memory location if the second instruction is a write instruction.

7. The system of claim 5, wherein the execution engine reads from the memory location if the second instruction is a read instruction.

8. The system of claim 5, wherein the second page address is a predetermined null address.

9. A method for controlling radio components, said method comprising:

executing a first instruction, said first instruction comprising a first page address and a first byte address;

fetching a second instruction, said second instruction comprising a second page address and a second byte address;

accessing a first memory location associated with the first page address and the second byte address responsive to fetching the second instruction, wherein the second page address is a predetermined address; and accessing a second memory location associated with the second page address and the second byte address responsive to fetching the second instruction, wherein the second page address is not the predetermined address.

10. A system for executing instructions, said system comprising:

a microcode random access memory (RAM) for storing a first instruction and a second instruction, wherein the first instruction comprises a first page address and a first byte address, and wherein the second instruction comprises a second page address and a second byte address;

a fetch stage for fetching the second instruction from the microcode RAM;

a decode stage for determining whether the second page address is a predetermined null address; and an execution engine for accessing a memory location in a radio frequency (RF) RAM associated with the first page address and the second byte address, responsive to the decode stage determining that the second page address is the predetermined null address and for accessing a memory location in the RF RAM associated with the second page address and the second byte address, responsive to the decode stage determining that the second page address is not the predetermined null address.

* * * * *

UNITED STATES PATENT AND TRADEMARK OFFICE
CERTIFICATE OF CORRECTION

PATENT NO.   : 6,584,542 B1
DATED        : June 24, 2003
INVENTOR(S)  : David Weigand It is certified that error appears in the above-identified patent and that said Letters Patent is hereby corrected as shown below:

<u>Title page, Item [54] and Column 1, line 1,</u>
Please delete "MICROWAVE PAGING ARCHITECTURE" and replace with the following -- MICROWIRE PAGING ARCHITECTURE --

Signed and Sealed this

Seventh Day of October, 2003

JAMES E. ROGAN
*Director of the United States Patent and Trademark Office*